_US009025899B2_

United States Patent
Pomianowski et al.

(10) Patent No.: US 9,025,899 B2
(45) Date of Patent: May 5, 2015

(54) REGION-BASED IMAGE COMPRESSION

(71) Applicant: Advanced Micro Devices, Inc., Sunnyvale, CA (US)

(72) Inventors: Andrew S. Pomianowski, Sunnyvale, CA (US); Konstantine Iourcha, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 244 days.

(21) Appl. No.: 13/651,020

(22) Filed: Oct. 12, 2012

(65) Prior Publication Data

US 2013/0094775 A1 Apr. 18, 2013

Related U.S. Application Data

(60) Provisional application No. 61/547,648, filed on Oct. 14, 2011.

(51) Int. Cl.
*G06K 9/46* (2006.01)
*H04N 19/587* (2014.01)
*H04N 19/119* (2014.01)
(Continued)

(52) U.S. Cl.
CPC .......... *H04N 19/587* (2013.01); *H04N 19/119* (2013.01); *H04N 19/46* (2013.01); *H04N 19/196* (2013.01); *H04N 19/122* (2013.01); *H04N 19/96* (2013.01); *H04N 19/12* (2013.01); *H04N 19/124* (2013.01); *H04N 19/146* (2013.01);
(Continued)

(58) Field of Classification Search
USPC ............. 382/100, 232, 233, 240; 375/240.02, 375/240.21; 704/230
See application file for complete search history.

(56) References Cited

U.S. PATENT DOCUMENTS

| 6,856,701 B2 * | 2/2005 | Karczewicz et al. ......... 382/247 |
| 2002/0143556 A1 * | 10/2002 | Kadatch ........................ 704/500 |

(Continued)

FOREIGN PATENT DOCUMENTS

| EP | 0 785 688 A2 | 7/1997 |
| WO | 2008027413 A2 | 3/2008 |

OTHER PUBLICATIONS

Kim, I.K., et al., "Rate-distoration optimization of the image compression algorithm based on the warped discrete cosine transform," Signal Processing, vol. 83, No. 9, Sep. 2003, Elsevier B.V. (10 pages).

(Continued)

*Primary Examiner* — Chan Park
*Assistant Examiner* — Eueng-Nan Yeh
(74) *Attorney, Agent, or Firm* — Volpe and Koenig, P.C.

(57) ABSTRACT

A method for compressing an image includes decomposing the image into one or more regions. A region of the image is selected to be evaluated. The selected region is transformed and quantized if the region does not meet a predetermined compression acceptability criteria. The predetermined compression acceptability criteria may include a specific bit rate, a specific image quality, or combinations thereof. If the region does not meet the predetermined compression acceptability criteria after the region has been transformed and quantized, then the transformation and quantization settings are adjusted and the region is transformed and quantized using the adjusted settings. The region is then encoded when the predetermined compression acceptability criteria has been reached. The encoding may include additional compression stages.

23 Claims, 5 Drawing Sheets

(51) Int. Cl.
| | |
|---|---|
| *H04N 19/46* | (2014.01) |
| *H04N 19/196* | (2014.01) |
| *H04N 19/122* | (2014.01) |
| *H04N 19/96* | (2014.01) |
| *H04N 19/12* | (2014.01) |
| *H04N 19/124* | (2014.01) |
| *H04N 19/17* | (2014.01) |
| *H04N 19/194* | (2014.01) |
| *H04N 19/146* | (2014.01) |
| *H04N 19/154* | (2014.01) |
| *H04N 19/10* | (2014.01) |

(52) U.S. Cl.
CPC .............. *H04N19/154* (2013.01); *H04N 19/17* (2013.01); *H04N 19/194* (2013.01); *H04N 19/10* (2013.01)

(56) References Cited

U.S. PATENT DOCUMENTS

| | | | |
|---|---|---|---|
| 2005/0276323 A1* | 12/2005 | Martemyanov et al. | 375/240.03 |
| 2007/0189621 A1 | 8/2007 | Liu | |
| 2009/0190654 A1* | 7/2009 | Shimazaki et al. | 375/240.01 |
| 2011/0142137 A1* | 6/2011 | Leigh et al. | 375/240.18 |

OTHER PUBLICATIONS

Han, W.J., "Improved Video Compression Efficiency Through Flexible Unit Representation and Corresponding Extension of Coding Tools," IEEE Transactions on Circuits and Systems for Video Technology, vol. 20, No. 12, Dec. 2010 (12 pages).

* cited by examiner

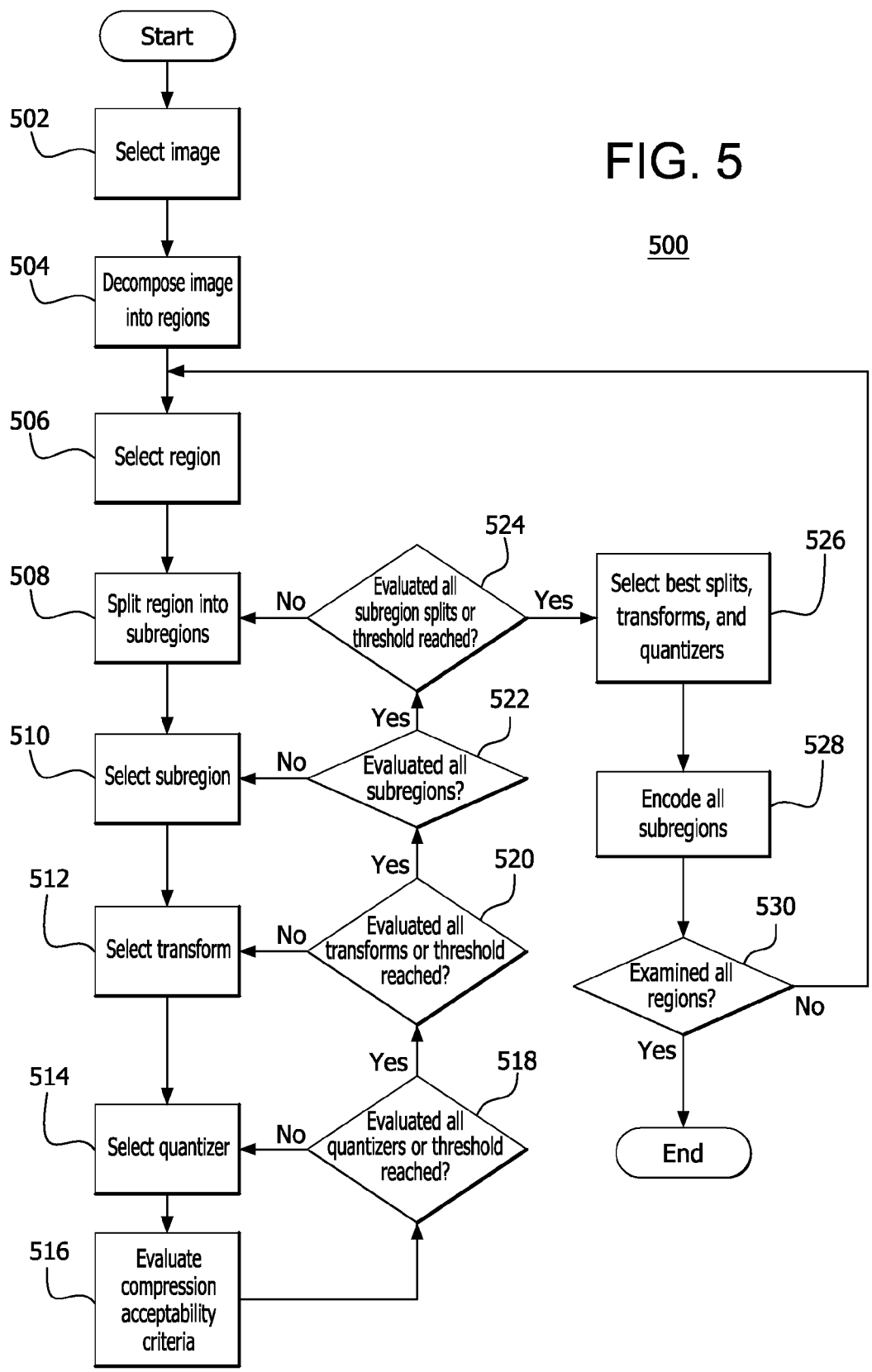

REGION-BASED IMAGE COMPRESSION

CROSS REFERENCE TO RELATED APPLICATIONS

This application claims the benefit of U.S. provisional application No. 61/547,648 filed Oct. 14, 2011, the contents of which are hereby incorporated by reference as if fully set forth herein.

FIELD OF INVENTION

The present invention is generally directed to image compression and in particular, to a method for region-based image compression.

BACKGROUND

Lossy compression techniques require methods to effectively encode images at lower bit rates without sacrificing significant image quality. Fixed rate compression schemes generally have poor image quality at rates significantly below four bits per pixel. Some existing variable rate compression techniques, like Joint Photographic Experts Group (JPEG), apply some form of transform and quantization.

Some methods of reducing the amount of data to be stored after compression may involve storing the data in a sparse manner and interpolating the results. Existing methods generally have not provided good levels of image quality, and in some cases may also introduce potentially undesired image artifacts (e.g., high frequency noise).

SUMMARY OF EMBODIMENTS

Adding a local per-region transform and quantization step before subsequent compression steps may reduce the amount of data to be compressed, thereby reducing the required bit rate needed to maintain a high level of image quality. During decompression, a reconstruction transformation is applied to generate the pixel values. Overall, performing a per-region transform and quantization permits better tradeoffs to be made in attaining low bit rates with high image quality, without adding unmanageable complexity to the image decoding.

A method for compressing an image includes decomposing the image into one or more regions. A region of the image is selected to be evaluated. The selected region is transformed and quantized if the region does not meet a predetermined compression acceptability criteria. The predetermined compression acceptability criteria may include a specific bit rate, a specific image quality, or combinations thereof. If the region does not meet the predetermined compression acceptability criteria after the region has been transformed and quantized, then the transformation and quantization settings are adjusted and the region is transformed and quantized using the adjusted settings. The region is then encoded when the predetermined compression acceptability criteria has been reached.

A method for compressing an image includes decomposing the image into one or more regions. A region of the image is selected to be evaluated. The selected region is decomposed into subregions. The subregions are transformed and quantized if the region does not meet a predetermined compression acceptability criteria. If the region does not meet the predetermined compression acceptability criteria based on a combination of subregion split, transform, and quantization, then the subregion split is adjusted and the adjusted subregion is transformed and quantized. The region is then encoded when the predetermined compression acceptability criteria has been reached.

A method for decompressing an image, the image including one or more regions, includes selecting a region of the image to decode. The selected region and metadata associated with the selected region are decoded. A reconstruction transformation is applied to the selected region, wherein the metadata includes information regarding the reconstruction transformation.

A method for decompressing an image, the image including one or more regions, each of which includes one or more subregions. A region of the image is selected to be decompressed. The selected region and metadata associated with the selected region are decoded. Reconstruction transformations are applied to each of the subregions in the selected region, wherein the metadata includes information regarding the reconstruction transformations.

A system for compressing an image includes an encoder. The encoder is configured to decompose the image into one or more regions, select a region of the image to evaluate, and transform and quantize the region if the region does not meet a predetermined compression acceptability criteria. If the region does not meet the predetermined compression acceptability criteria after the region has been transformed and quantized, the encoder is further configured to adjust the transformation and quantization settings, and transform and quantize the region using the adjusted settings. The region is then encoded when the predetermined compression acceptability criteria has been reached.

A system for decompressing an image, the image including one or more regions, includes a decoder. The decoder is configured to select a region of the image to decode, decode the selected region and metadata associated with the selected region, and apply a reconstruction transformation to the selected region, wherein the metadata includes information regarding the reconstruction transformation.

A non-transitory computer-readable storage medium storing a set of instructions for execution by a general purpose computer to compress an image, includes a decomposing code segment, a selecting code segment, a transforming and quantizing code segment, an adjusting code segment, and an encoding code segment. The decomposing code segment is for decomposing the image into one or more regions. The selecting code segment is for selecting a region of the image to evaluate. The transforming and quantizing code segment is for transforming and quantizing the region if the region does not meet a predetermined compression acceptability criteria. The adjusting code segment is for adjusting the transformation and quantization settings if the region does not meet the predetermined compression acceptability criteria after the region has been transformed and quantized. The encoding code segment is for encoding the region when the predetermined compression acceptability criteria has been reached.

A method for compressing an image includes decomposing the image into one or more regions. A region is selected, and is split into one or more subregions. A subregion, one of a plurality of transforms, and one of a plurality of quantizers are selected. The selected subregion split, transform, and quantizer are evaluated against a predetermined compression acceptability criteria. Each of the subregions, the subregion splits, the transforms, and the quantizers are iteratively selected to determine a best subregion split, transform, and quantizer in terms of the predetermined compression acceptability criteria. All of the subregions are encoded using the best subregion split, transform, and quantizer when the predetermined compression acceptability criteria has been reached.

A method for compressing an image includes decomposing the image into one or more regions. A region of the image is selected to be evaluated. The selected region is compressed, and is transformed and quantized if the compressed region does not meet a predetermined compression acceptability criteria. If the transformed and quantized region does not meet the predetermined compression acceptability criteria after it has been transformed and quantized, then the transformation and quantization settings are adjusted. The compressed region is transformed and quantized using the adjusted settings. The transformed and quantized region is encoded when the predetermined compression acceptability criteria has been reached.

BRIEF DESCRIPTION OF THE DRAWINGS

A more detailed understanding may be had from the following description, given by way of example in conjunction with the accompanying drawings, wherein:

FIG. 5 is a flow chart of a method for compressing an image that evaluates combinations of transforms and quantizers.

DETAILED DESCRIPTION

Fixed-rate block-based compression techniques require methods to effectively encode images at low bit rates without sacrificing significant image quality. Adding a local per-region transform and quantization step in front of any subsequent encoding and/or compression steps reduces the amount of data to be encoded and/or compressed to retain image quality while achieving a desired target bit rate. To decompress the region, the compressed data may first be fully or partially decompressed according to the underlying compression scheme (depending on the implementation). The reconstruction transformation is then applied to produce the approximation to the original uncompressed data. If any coefficients were discarded during quantization, those coefficients are assumed to be zero for the purposes of the reconstruction transformation.

Figure 1:
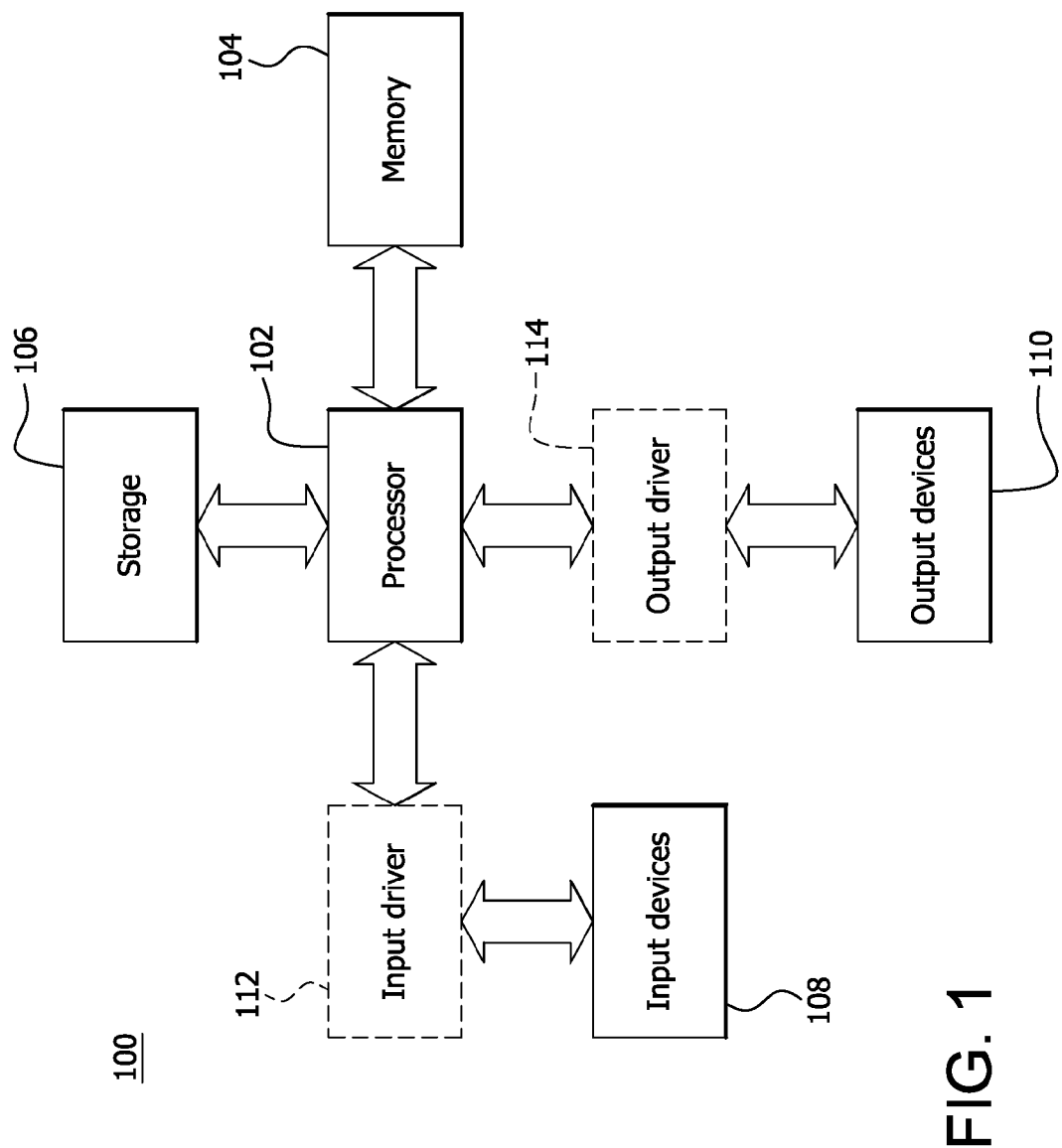
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
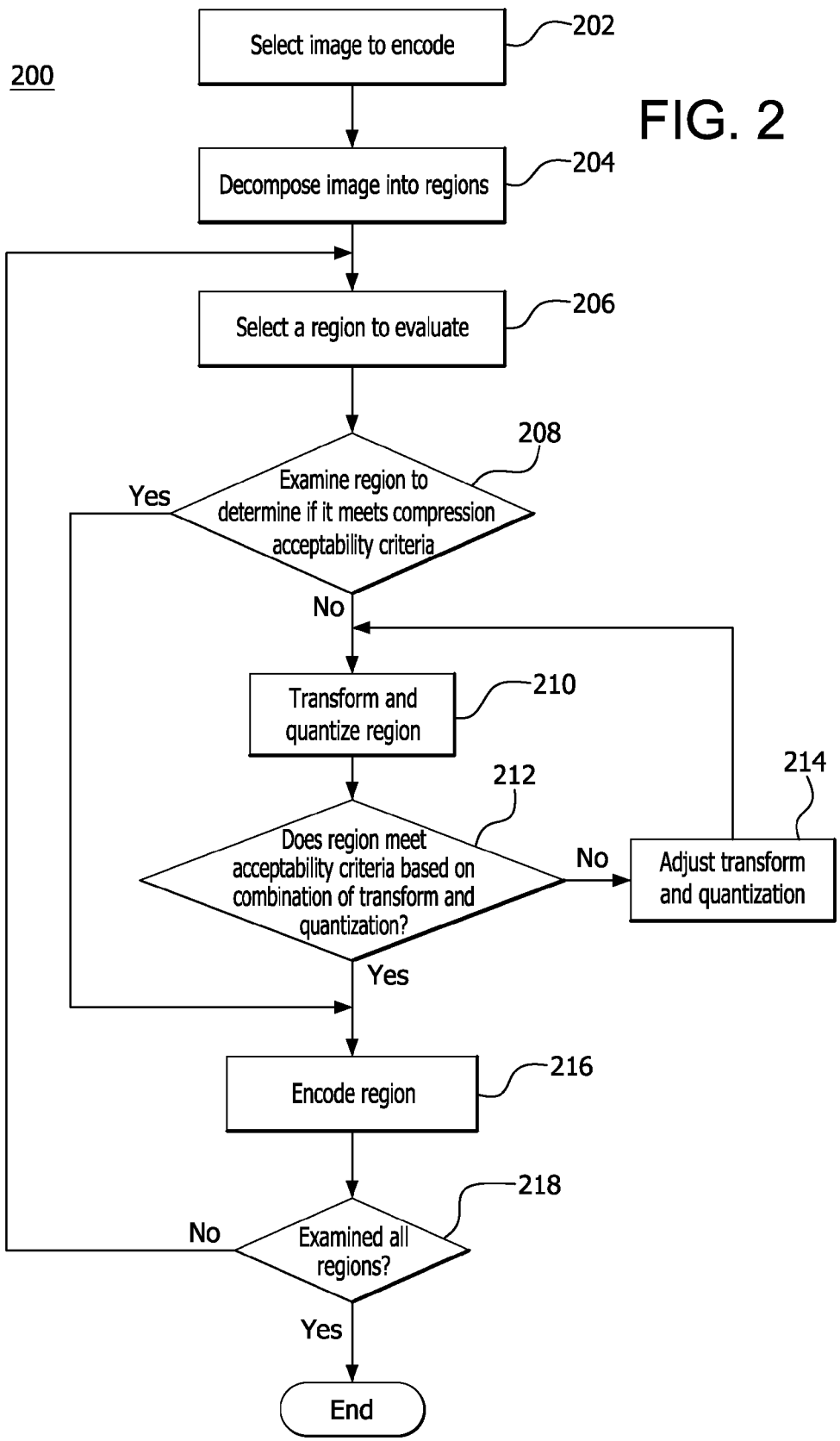
FIG. 2 is a flow chart of a method for compressing an image.

FIG. 2 is a flow chart of a method 200 for compressing an image. An image to be encoded is selected (step 202) and the selected image is decomposed into several regions according to a predetermined method (step 204). The regions may be a fixed size or a variable size, and the decomposing method may be hierarchical. It is noted that the particular method used to decompose the image into regions does not affect the overall operation of the method 200.

A region is selected for evaluation (step 206) and is examined to determine if the region meets a predetermined compression acceptability criteria (step 208). The predetermined compression acceptability criteria may include, but is not limited to, a specific bit rate, a specific image quality, or combinations thereof. It may be possible to encode the region to meet the predetermined compression acceptability criteria using the basic underlying compression system. In this case, no additional transform and quantization step is required, and the region can be processed directly in the encoding stage. This may be viewed as a special case where the transform is the identity transform.

If the region does not meet the predetermined compression acceptability criteria (step 208), then several refinements may be performed. The region is transformed and quantized (step 210). If the method determines that the region needs to be transformed and quantized to satisfy predefined compression acceptability criteria, then the method selects the transform and quantization from a predefined set. In one embodiment, the set may include only linear transforms, for example filtering with a smoothing kernel, wavelet transforms, curvelet transforms, Gabor wavelet transforms, etc. In another embodiment, the set may include non-linear transforms.

As part of its optimization procedure, the encoder may evaluate multiple potential combinations of transform and quantization, selecting the combination that achieves the highest quality at the predetermined compression acceptability criteria. The encoder may have parameters to control the extent of any optimization steps at this stage to tradeoff overall compression quality against encoding performance. These controls may limit the extent of the search for optimal transforms and quantizations, and may also provide threshold values, permitting the technique to exit early when certain targets are reached.

Quantization is performed by taking the coefficients output from the transform and rounding them to a predefined set of values, and the set may be different for each coefficient. In some embodiments, sets of the values corresponding to some of the coefficients may consist of a single value of zero, which means that the corresponding coefficients are discarded (such as in downsampling). After quantization, the remaining coefficients are encoded.

It is then determined whether the region meets the predetermined compression acceptability criteria based on a combination of transform and quantization (step 212). If the region does not meet the predetermined compression acceptability criteria, then the transform and quantization settings may be adjusted (step 214) and the adjusted region is transformed and quantized with the adjusted settings (step 210).

After optimizing the transformation and quantization, and the region meets the predetermined compression acceptability criteria or all candidate settings have been evaluated and the best settings are chosen (steps 208 or 212), the region is encoded (step 216). The encoding may incorporate some underlying compression. For each region, the output data format includes some metadata to be stored and/or transmitted with the region, to indicate the transform and the quantization applied for that region and other information that may be required for decoding. In addition, the encoded region may be transmitted (not shown in FIG. 2). If all of the regions of the image have not been examined (step 218), then the method continues by selecting another region to evaluate (step 206). If all of the regions of the image have been examined (step 218), then the method terminates.

In a specific implementation of the method 200 (not shown), the transform and quantization in step 210 may be configured to be a downscaling operation. A region that is to be compressed is evaluated and downscaled with a selected aspect ratio (which encompasses the transform and quantization) prior to compression, to reduce the total number of pixels in the region while retaining as much of the information as possible. Performing the downscaling reduces the amount of data prior to encoding, allowing the encoding (which may include additional compression steps) to occur with a higher accuracy for a given bit rate. One of a set of different aspect ratios may be selected for downscaling the region. The selected aspect ratio provides the best results according to a selected error metric (for example, peak signal to noise ratio) by evaluating the results of quantizing to each possible ratio against this metric for the current region.

In one implementation, the target bit rate is known (for example, in a fixed-rate compression scheme), and the amount of space available at the target bit rate can be calculated. With this information, there may be multiple ways a region could be scaled to fit in the available space. During downscaling, some of the high-frequency image information is discarded, effectively blurring the region. Depending on the content of the original region, the choice of the scaling aspect ratio may have a significant impact on preserving the image quality. By applying a non-uniform scaling to the original data, more of the important information in the original image can be preserved. By having a different level of scaling for each region, the compression can respond to local characteristics in the image content for different regions. The implementation may potentially examine multiple possible choices of transform and quantization for each region in the image to optimize the predetermined compression acceptability criteria.

Figure 3:
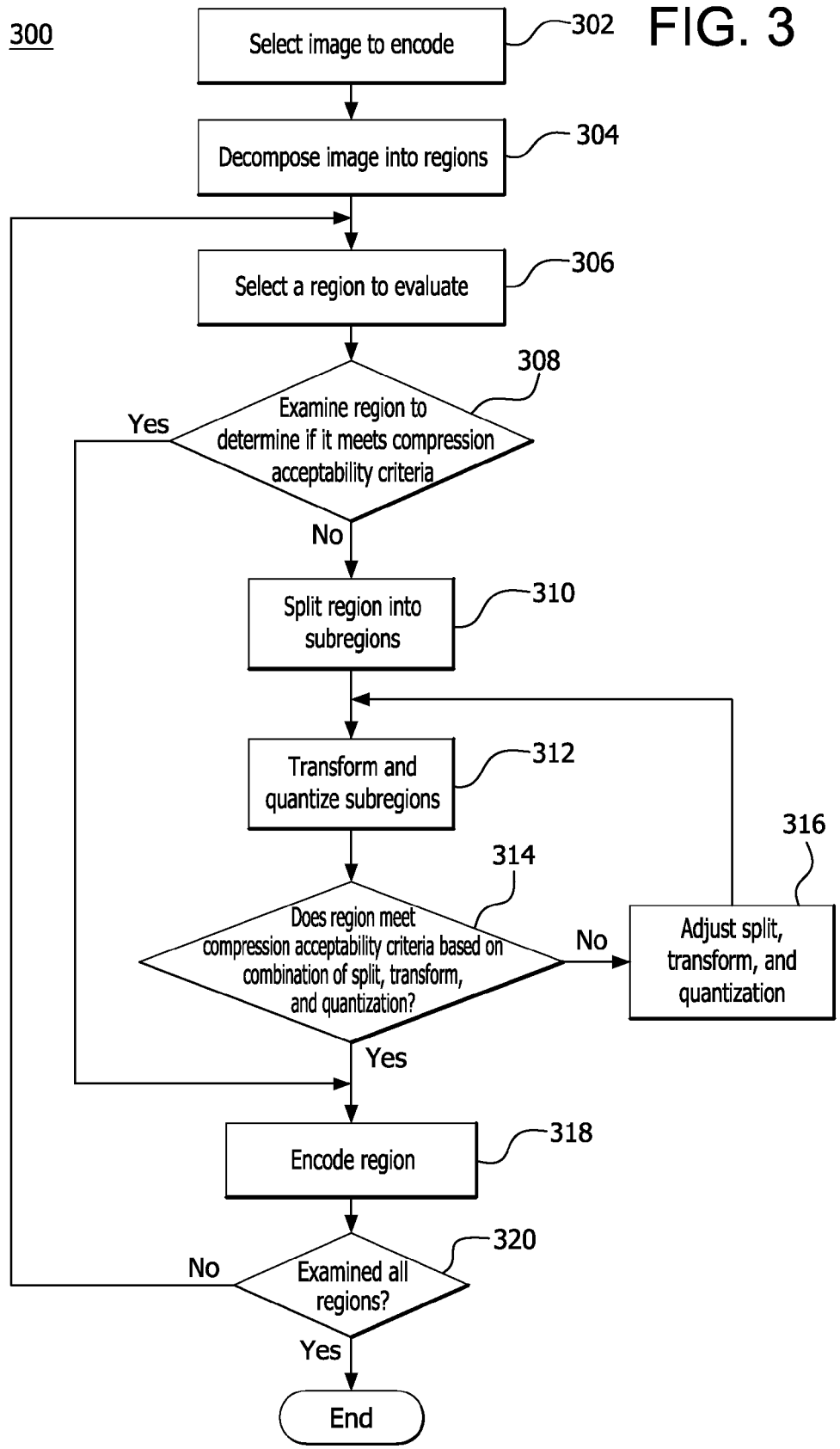
FIG. 3 is a flow chart of an alternate method for compressing an image.

FIG. 3 is a flow chart of an alternate method 300 for compressing an image. An image to be encoded is selected (step 302) and the selected image is decomposed into several regions according to a predetermined method (step 304). The regions may be a fixed size or a variable size, and the decomposing method may be hierarchical. It is noted that the particular method used to decompose the image into regions does not affect the overall operation of the method 300.

A region is selected for evaluation (step 306) and is examined to determine if the region meets a predetermined compression acceptability criteria (step 308). The predetermined compression acceptability criteria may include, but is not limited to, a specific bit rate, a specific image quality, or combinations thereof. It may be possible to encode the region to meet the predetermined compression acceptability criteria using the basic underlying compression system. In this case, no transform and quantization step is required, and the region can be processed by the underlying compression scheme. This may be viewed as a special case where the transform is the identity transform.

If the region does not meet the predetermined compression acceptability criteria (step 308), then several refinements may be performed. The region is split into subregions (step 310), and the subregions are transformed and quantized (step 312). If the encoder determines that the region needs to be split, transformed, and quantized to satisfy the predetermined compression acceptability criteria, then the encoder selects a split, transform, and quantization from a set of predefined splits, transforms, and quantizations. In one embodiment, the set may include only linear transforms, for example filtering with a smoothing kernel, wavelet transforms, curvelet transforms, Gabor wavelet transforms, etc. In another embodiment, the set may include non-linear transforms.

As part of its optimization procedure, the encoder may evaluate multiple potential combinations of region split (how the region is split into subregions), transform, and quantization, selecting the combination that achieves the highest quality to meet the predetermined compression acceptability criteria. The encoder may have parameters to control the extent of any optimization steps at this stage to tradeoff overall compression quality against encoding performance. These controls may limit the extent of the search for optimal regions, subregion splits, transforms, and quantizations, and may also provide threshold values, permitting the technique to exit early when certain targets are reached.

It is then determined whether the region meets the predetermined compression acceptability criteria based on a combination of split, transform, and quantization (step 314). If the region does not meet the predetermined compression acceptability criteria, then the split (how the region is split into subregions), transform, and/or quantization may be adjusted (step 316) and the adjusted subregions are transformed and quantized (step 312) based on the adjustment(s). If the split is adjusted (step 316), a different splitting technique may be used to generate alternative region splits that may result in achieving the predetermined compression acceptability criteria.

After optimizing the region split, transformation, and quantization, and the region meets the predetermined compression acceptability criteria and/or other termination conditions for this processing (steps 308 or 314), the region is encoded (step 318). The encoding may incorporate some underlying compression. For each region, the output data format includes some metadata to be stored and/or transmitted with the region, to indicate the region split, the transform, and the quantization applied for that region and other information that may be required for decoding. In addition, the encoded region may be transmitted (not shown in FIG. 3). If all of the regions of the image have not been examined (step 320), then the method continues by selecting another region to evaluate (step 306). If all of the regions of the image have been examined (step 320), then the method terminates.

Figure 4:
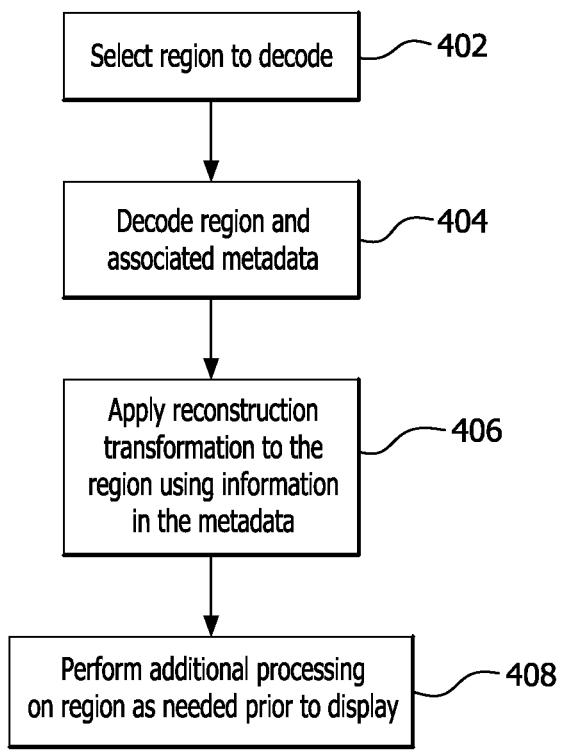
FIG. 4 is a flow chart of a method for decompressing a region of an image.

FIG. 4 is a flow chart of a method 400 for decompressing a region of an image. A region of the image is selected for decoding (step 402), and the selected region and its associated metadata are decoded (step 404). A reconstruction transformation is applied to the region using information included in the metadata (step 406). Additional processing is then performed on the region as needed prior to displaying the image (step 408). Examples of the additional processing may include, for example, texture mapping operations, etc.

In an alternate embodiment of the method 400 (not shown) the region may be split into subregions. The subregions may share a single transform and quantization (specified for the whole region), or each subregion may have its own individual transform and quantization specified.

In an alternate embodiment of the method 400 (not shown), step 406 may be an upscaling operation, if the region was downscaled during encoding. The data is expanded according to the underlying compression method for the region. The region is then upscaled using information included in the metadata describing the aspect ratio used for the downscaling (step 406). The upscaling may use any applicable filter, but to preserve image quality, the encoder needs to know what filter will be used by the decoder, as this allows the compression quality to be tuned more precisely. In a hardware implementation, the upscaling filter may be bilinear, because this filter is simple and cheap to implement. Other types of upscaling filters may be used without substantially altering the operation of the method 400. In addition, the type of filter used for upscaling may be uniform over the entire image or may be selected independently for each region of the image.

In one implementation of this embodiment, the encoder uses a fixed-rate region-based compression scheme with a given region size, e.g., 8×8. Each region is compressed independently. If it is not possible to encode every pixel in the region explicitly at the required bit rate, then the region is downscaled by a predetermined ratio prior to compression. For example, the 8×8 region may be reduced in size to 8×6, which would reduce the amount of pixel information that needs to be stored by 25%. The level of information reduction is chosen to allow the region to be encoded at the desired compression acceptability criteria. The downscaling may be accomplished by any appropriate method, with higher quality methods being used to retain more useful information.

For a given amount of final information, there may be several different ways of scaling the region to reduce the amount of information that needs to be stored by a similar amount. For example, 8×6, 7×7, and 6×8 sets of pixels all require approximately the same amount of final data to encode. For each region, the encoder may try different ratios, and use the ratio that provides the best image quality in terms of the predetermined compression acceptability criteria (selecting from the multiple different quantizations).

In some regions of the image, it is noted that the method may choose to use a higher level of downscaling (e.g., 8×5, 8×4, 6×5, etc.) and evaluate these ratios in conjunction with the encoder using back-end compression schemes that have a lower compression rate. By reducing the number of unique pixels that need to be stored, the remaining pixels may be encoded with a higher accuracy (i.e., a lower compression rate), while achieving the same predetermined compression acceptability criteria. In smooth regions of an image, it may be advantageous to use these higher levels of downscaling while encoding the final pixels at higher precision. Conversely, in some regions (for example, those regions with more high-frequency content), it may be more optimal in terms of image quality to use minimal or no scaling (quantization), and instead use a higher rate of back-end compression.

One extension to this embodiment is to downsample information along a selected vector direction, to preserve more of the image quality in the region (rather than the approximation achieved using downsampling aligned to the X and Y axes but with a variable aspect ratio). In this case, the quantization could be the same as above, but the transform is now different. This extension may allow better preservation of detail in regions of the image where the high frequency content is aligned closer to the diagonals. For example, if an image can be downscaled with knowledge of the direction of motion in the image (if any), then the high-frequency information orthogonal to the direction of the motion can be retained, while other information may be discarded.

A second extension to this embodiment is to subdivide the original region further into subregions, and independently scale each subregion (select a different transform and quantization for each subset) to better match the characteristics of the region to provide a higher image quality.

FIG. 5 is a flow chart of a method 500 for compressing an image that evaluates combinations of regions, subregions, transforms, and quantizers. An image to be encoded is selected (step 502) and the selected image is decomposed into regions (step 504). A region of the image is selected (step 506). To evaluate the selected region of the image, the selected region is split into subregions (step 508), a subregion is selected (step 510), a transform is selected (step 512), and a quantizer is selected (step 514). Based on the selected subregion, transform, and quantizer, the selected subregion of the image is processed and evaluated to determine whether it meets predetermined compression acceptability criteria (step 516). It is noted that the selection of the split (step 508), transform (step 512), and quantizer (step 514) may be performed in any order without affecting the overall operation of the method 500. Optionally, the compression acceptability criteria that are determined by the selected subregion split, transform, and quantizer may be stored for later comparison.

To ensure that the best possible combination of split, transform, and quantizer are chosen for the selected region, all of the splits, transforms, and quantizers will be evaluated. It should be understood that in an optimized embodiment, the method may not exhaustively enumerate all combinations of region split, subregion split, transform, and quantizer, but may use an optimized search approach to produce the same or similar result.

If all of the quantizers have not been evaluated or a threshold compression acceptability criteria has not been reached (step 518), then another quantizer is selected (step 514) and processing continues as described above. If all of the quantizers have been evaluated or if the threshold compression acceptability criteria has been reached (step 518), then a determination is made whether all of the transforms have been evaluated or the threshold compression acceptability criteria has been reached (step 520).

If all of the transforms have not been evaluated or the threshold compression acceptability criteria has not been reached (step 520), then another transform is selected (step 512) and processing continues as described above. If all of the transforms have been evaluated or the threshold compression acceptability criteria has been reached (step 520), then a determination is made whether all subregions have been evaluated (step 522).

If all of the subregions of the region have not been evaluated (step 522), then another subregion of the region is selected (step 510) and processing continues as described above. If all of the subregions have been evaluated (step 522), then a determination is made whether all of the subregion splits have been evaluated or the threshold compression acceptability criteria has been reached (step 524).

If all of the subregion splits have not been evaluated and the threshold compression acceptability criteria has not been reached (step 524), then the region is split into different subregions (step 508) and processing continues as described above. In an alternative embodiment (not shown), the threshold compression acceptability criteria defined in steps 518, 520, and 524 may not be used.

After all combinations of splits, transforms, and quantizers have been evaluated or the threshold compression acceptability criteria for the selected region has been reached, the best splits, transforms, and quantizers are selected (step 526). All of the subregions of the region are encoded using the best subregion splits, transforms, and quantizers (step 528). In one implementation, the encoding in step 528 may also include additional compression. For each region, the output data format includes some metadata to be stored and/or transmitted with the region, to indicate the subregion splits, transforms, and quantizers applied for that region and other information that may be required for decoding.

Next, a determination is made whether all of the regions of the image have been examined (step 530). If all of the regions of the image have not been examined, then another region of the image is selected (step 506) and processing continues as described above. If all of the regions of the image have been examined (step 530), then the method terminates.

Other embodiments are possible, where the transformation and quantization are tightly coupled with the final encoding, and also with the implementation of the decoding. In addition to the following two examples, other embodiments are possible.

In a first example embodiment, texture filtering operations will be performed on the decoded data, so an upscaling filter may be implemented by manipulating the texture filtering hardware, rather than by implementing an additional dedicated upscaler.

In a second example embodiment, the underlying compression (encoding) generates index coefficients that are used to select colors. In this case, the transformation and quantization may be performed on the index coefficients produced by the underlying encoder, rather than on the original color data. In this embodiment, the region is compressed prior to the region being transformed and quantized.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for compressing an image, comprising:
decomposing the image into one or more regions;
selecting a region of the image to evaluate;
decomposing the selected region into subregions;
if the region does not meet a predetermined compression acceptability criteria, transforming and quantizing the subregions based on transformation and quantization settings;
if the region does not meet the predetermined compression acceptability criteria based on a combination of subregion split, transform, and quantization:
adjusting the subregion split; and
transforming and quantizing the adjusted subregions using the transformation and quantization settings; and
encoding the region when the predetermined compression acceptability criteria has been reached.

2. The method of claim 1, wherein each of the one or more regions has a fixed size and shape.

3. The method of claim 1, wherein each of the one or more regions has a variable size and shape.

4. The method of claim 1, wherein the transforming implements a downscaling operation of the region with a selected aspect ratio.

5. The method according to claim 4, further comprising:
compressing each region after downscaling using a fixed or variable bit rate compression scheme.

6. The method according to claim 5, wherein for each region, the compressing includes selecting from a set of available compression methods, with each compression method associated with a set of possible scaling aspect ratios that meet a specific compression acceptability criteria.

7. The method according to claim 1, wherein the encoding includes applying additional levels of compression.

8. The method according to claim 1, wherein the encoding includes storing metadata with the encoded region, the metadata indicating the transform and quantization settings applied for the region.

9. The method according to claim 1, wherein the transforming includes a linear transformation or a non-linear transformation.

10. A method for compressing an image, comprising:
decomposing the image into one or more regions;
selecting a region of the image to evaluate;
if the region does not meet a predetermined compression acceptability criteria, transforming and quantizing the region based on transformation and quantization settings;
if the region does not meet the predetermined compression acceptability criteria after the region has been transformed and quantized:

adjusting the transformation and quantization settings; and transforming and quantizing the region using the adjusted transformation and quantization settings; and encoding the region when the predetermined compression acceptability criteria has been reached.

11. The method according to claim 10, wherein each of the one or more regions has a fixed size and shape.

12. The method according to claim 10, wherein each of the one or more regions has a variable size and shape.

13. The method according to claim 10, wherein the transforming implements a downscaling operation of the region with a selected aspect ratio.

14. The method according to claim 13, further comprising: compressing each region after downscaling using a fixed or variable bit rate compression scheme.

15. The method according to claim 14, wherein for each region, the compressing includes selecting from a set of available compression methods, with each compression method associated with a set of possible scaling aspect ratios that meet a specific compression acceptability criteria.

16. The method according to claim 10, wherein the encoding includes applying additional levels of compression.

17. The method according to claim 10, wherein the encoding includes storing metadata with the encoded region, the metadata indicating the transformation and quantization settings applied for the region.

18. The method according to claim 10, wherein the transforming includes a linear transformation or a non-linear transformation.

19. A non-transitory computer-readable storage medium storing a set of instructions for execution by a general purpose computer to compress an image, the set of instructions comprising:

a decomposing code segment for decomposing the image into one or more regions;

a selecting code segment for selecting a region of the image to evaluate;

a first transforming and quantizing code segment for transforming and quantizing the region based on transformation and quantization settings if the region does not meet a predetermined compression acceptability criteria;

an adjusting code segment for adjusting the transformation and quantization settings if the region does not meet the predetermined compression acceptability criteria after the region has been transformed and quantized;

a second transforming and quantizing code segment for transforming and quantizing the region using the adjusted transformation and quantization settings; and an encoding code segment for encoding the region when the predetermined compression acceptability criteria has been reached.

20. The non-transitory computer-readable storage medium according to claim 19, wherein the instructions are hardware description language (HDL) instructions used for the manufacture of a device.

21. A method for compressing an image, comprising:
decomposing the image into one or more regions;
selecting a region;
splitting the selected region into one or more subregions;
selecting a subregion;
selecting one of a plurality of transforms;
selecting one of a plurality of quantizers;
evaluating the selected subregion split, transform, and quantizer against a predetermined compression acceptability criteria;
iteratively selecting each of the subregions, the subregion splits, the transforms, and the quantizers to determine a best subregion split, transform, and quantizer in terms of the predetermined compression acceptability criteria; and
encoding all of the subregions using the best subregion split, transform, and quantizer when the predetermined compression acceptability criteria has been reached.

22. The method according to claim 21, wherein:
the iteratively selecting terminates early if a threshold compression acceptability criteria is met; and
the subregion split, transform, and quantizer that were selected when the threshold compression acceptability criteria is met are used to encode all of the subregions.

23. A method for compressing an image, comprising:
decomposing the image into one or more regions;
selecting a region of the image to evaluate;
compressing the selected region;
if the compressed region does not meet a predetermined compression acceptability criteria, transforming and quantizing the compressed region based on transformation and quantization settings;
if the transformed and quantized region does not meet the predetermined compression acceptability criteria after it has been transformed and quantized:
adjusting the transformation and quantization settings; and
transforming and quantizing the compressed region using the adjusted transformation and quantization settings; and
encoding the transformed and quantized region when the predetermined compression acceptability criteria has been reached.

* * * * *

UNITED STATES PATENT AND TRADEMARK OFFICE
CERTIFICATE OF CORRECTION

| | | |
|---|---|---|
| PATENT NO. | : 9,025,899 B2 | Page 1 of 1 |
| APPLICATION NO. | : 13/651020 | |
| DATED | : May 5, 2015 | |
| INVENTOR(S) | : Pomianowski et al. | |

It is certified that error appears in the above-identified patent and that said Letters Patent is hereby corrected as shown below:

ON THE TITLE PAGE
Second column, item (56) OTHER PUBLICATIONS, change "rate-distoration" to
-- rate-distortion --.

IN THE CLAIMS
Claim 8, column 10, line 53, change "transform" to -- transformation --.

Signed and Sealed this
Eighth Day of September, 2015

Michelle K. Lee
*Director of the United States Patent and Trademark Office*